United States Patent
Matsunaga et al.

[11] Patent Number: 5,852,536
[45] Date of Patent: Dec. 22, 1998

[54] MAGNETIC HEAD

[75] Inventors: Tohru Matsunaga; Naoyuki Kaneyama; Takehiko Saito, all of Miyagi; Masatoshi Hayakawa, Kanagawa, all of Japan

[73] Assignee: Sony Corporation, Tokyo, Japan

[21] Appl. No.: 818,121

[22] Filed: Mar. 14, 1997

[30] Foreign Application Priority Data

Mar. 14, 1996 [JP] Japan ................................... 8-057994
Dec. 13, 1996 [JP] Japan ................................... 8-333932

[51] Int. Cl.⁶ .................................................. G11B 5/193
[52] U.S. Cl. ............................................................ 360/122
[58] Field of Search ..................................... 360/122, 127

[56] References Cited

U.S. PATENT DOCUMENTS 4,916,563  4/1990  Kawase ................................... 360/122
5,515,222  5/1996  Kumagai et al. ....................... 360/122

FOREIGN PATENT DOCUMENTS 60-107710  6/1985  Japan ................................... 360/122
61-96506   5/1986  Japan ................................... 360/122
5-128421   5/1993  Japan ................................... 360/122

*Primary Examiner*—Robert S. Tupper
*Attorney, Agent, or Firm*—Hill & Simpson

[57] ABSTRACT

Sliding noise characteristics can be considerably improved without degrading electromagnetic conversion characteristics and abrasion resistance characteristics in a recording/reproducing operation. A depth (H) of a contact width regulating groove (21) is set to be smaller than a contact width (W) of a magnetic recording medium sliding surface (a), and is set to a predetermined value of 25 μm or more and 45 μm or less. A depth (H) of the contact regulating groove is set to a predetermined value of 37±12 μm, the contact width (W) on the magnetic recording medium sliding surface (a) is set to a predetermined value of 55±6 μm, and a value (R) of a corner portion of the contact width regulating groove is set to a predetermined value of 16 μm or less.

11 Claims, 14 Drawing Sheets

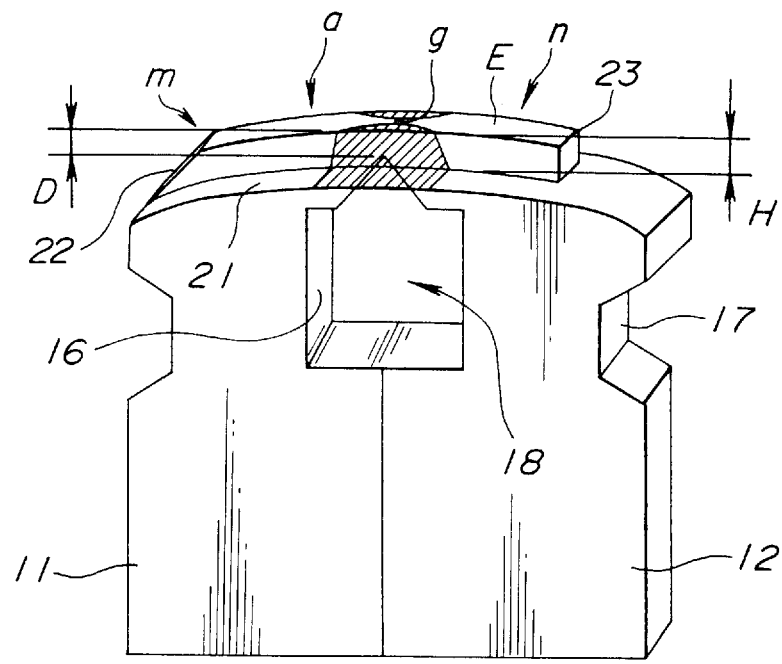
FIG.2
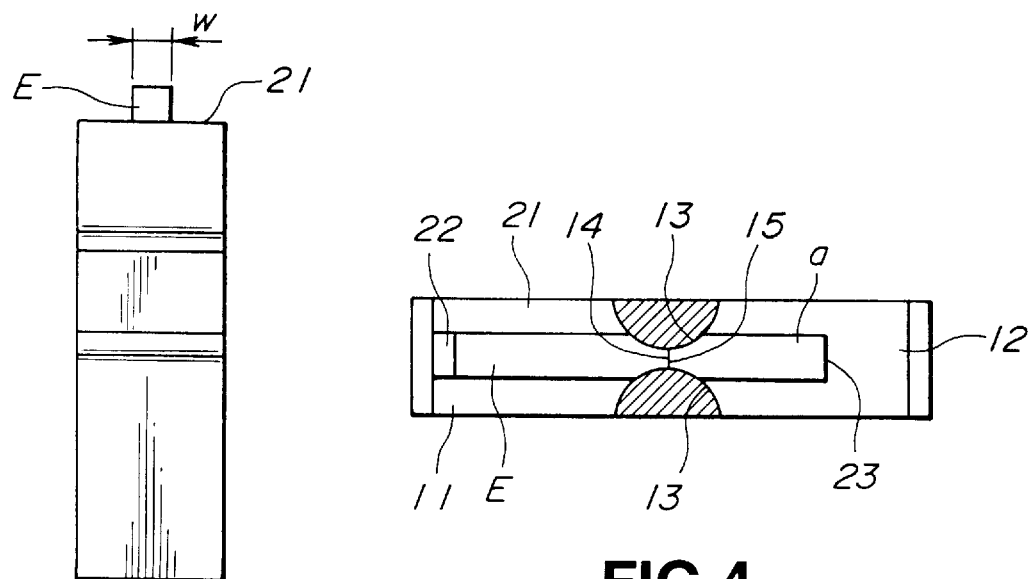
FIG.3
FIG.4

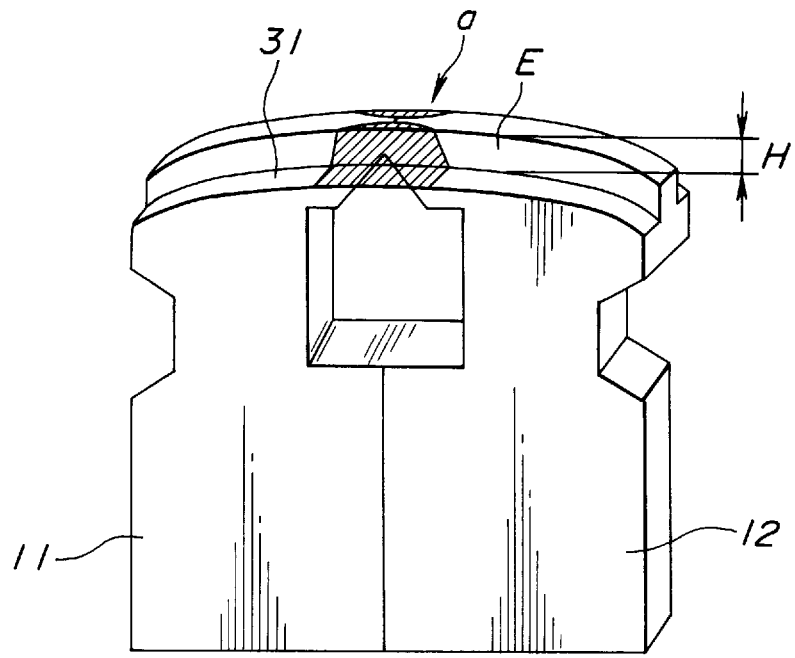
FIG.5
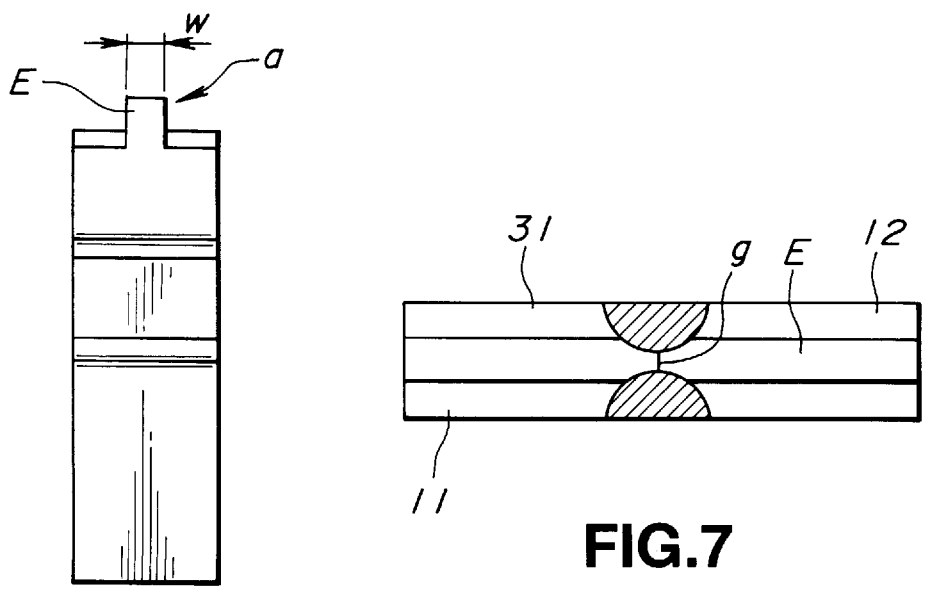
FIG.6
FIG.7

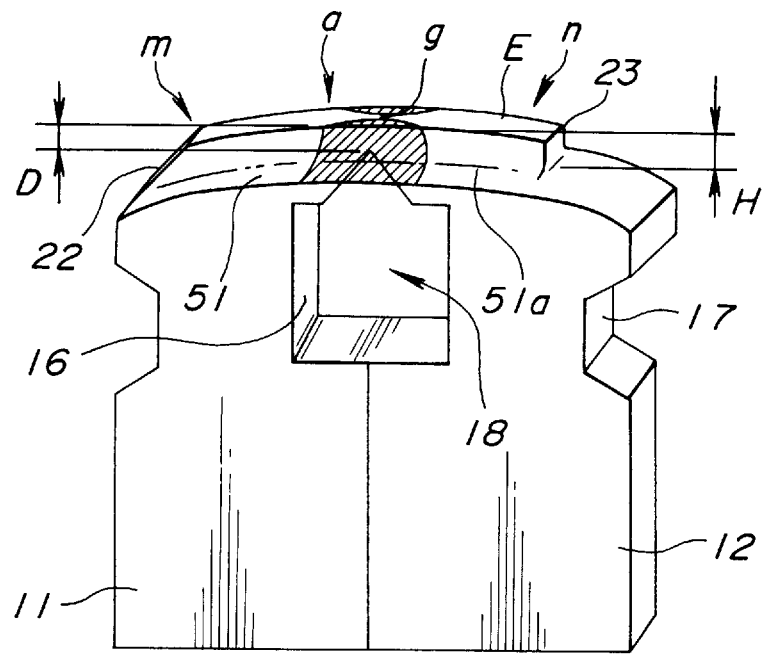
FIG.15
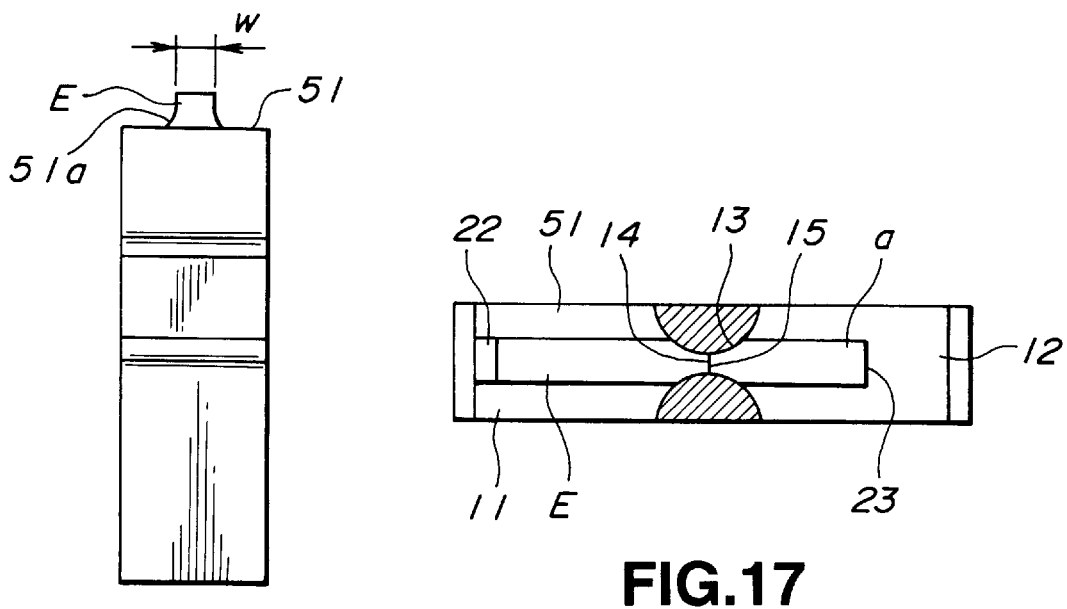
FIG.16
FIG.17

MAGNETIC HEAD

DETAILED DESCRIPTION OF THE INVENTION

1. Field of the Invention

The present invention relates to a magnetic head in which a pair of magnetic core half members are joined to each other at their opposite surfaces through a gap film to form a magnetic gap.

2. Prior Art

A magnetic head arranged in a general video tape recorder (VTR) is arranged on the peripheral surface of a rotating drum to serve as a rotation type magnetic head device. A magnetic recording medium sliding surface is slid on a magnetic tape serving as a magnetic recording medium to record/reproduce a video, an audio signal, or the like.

In recent years, technical innovation for miniaturizing of a VTR and improving the quality thereof is remarkable, and an increase in recording density of a magnetic tape serving as a magnetic recording medium is carried forward. In particular, in order to realize a high C/N in a magnetic tape having high coercive force (Hc), a so-called metal-in-gap magnetic head (MIG head) in which a metal magnetic film having a high saturation magnetic flux density is formed on each of the opposite surfaces of the magnetic core half members is for practical use.

With an increase in recording density, a decrease in track width or a gap length advances. The relative speed between a magnetic tape and the magnetic recording medium sliding surface of a magnetic head when the magnetic tape is slid is high. For this reason, as a material of a magnetic core constituting the magnetic head, a material having excellent processability and high abrasion resistance is required, for example, monocrystalline ferrite is popularly used.

More specifically, an MIG head using a monocrystalline ferrite as a material of a magnetic core is constituted as follows. That is, as shown in FIG. 1, a pair of magnetic core half members 101 and 102 in which metal magnetic films are formed on the opposite surfaces formed by the track width regulating groove 103 are opposite to each other through a gap film consisting of an insulating material such as $SiO_2$ and joined to each other with melted fuse glass to form a magnetic gap g having a predetermined azimuth angle.

A wire material such as copper is wound in a coil groove 104 or a guide groove 105 to form a magnetic coil (not shown), thereby constituting the magnetic head.

However, a magnetic head using a monocrystalline ferrite as the material of a magnetic core has the following problems.

Although the magnetic head using a monocrystalline ferrite as the material of a magnetic core is more excellent in output characteristics, abrasion resistance, accurate processability, or the like than a magnetic head using a polycrystalline ferrite as the material of a magnetic core, sliding noise is low, and a C/N decreases. In particular, since a use frequency band extends to a high frequency with a decrease in recording wavelength, it is further difficult to assure high-output characteristics by lowering the noise level.

SUMMARY OF THE INVENTION

The present invention has been made in consideration of the above problems, and has as its object to provide a magnetic head which capable of considerably improving sliding noise characteristics without degrading electromagnetic conversion characteristics or abrasion resistance characteristics in a recording/reproducing operation.

It is an object of the present invention to provide a metal-in-gap (MIG) magnetic head in which a pair of magnetic core half members are joined to each other at their opposite surfaces through a gap film to a magnetic gap, and a contact width regulating groove for regulating a contact width to a magnetic recording medium on a magnetic recording medium sliding surface is formed, wherein a metal magnetic film having a high saturation magnetic flux density is mainly formed on each of the opposite surfaces of the magnetic core half members.

What is referred to herein as a "contact regulating groove" can also be and is referred to as a "contact width regulating rabbet."

In this case, as each magnetic core half member, a magnetic core half member consisting of monocrystalline ferrite or a magnetic core half member having a portion consisting of monocrystalline ferrite near the magnetic gap and the remaining portion consisting of a polycrystalline ferrite is principally considered.

A magnetic head according to the present invention is constituted such that the depth of the contact width regulating groove is set to be smaller than the contact width of the magnetic recording medium sliding surface.

More specifically, is it preferable that the contact width of the magnetic recording medium sliding surface is set to a value of 55±6 µm, the depth of the contact regulating groove is set to 37±12 µm, and a value R of a corner portion of the contact width regulating groove is set to 16 µm or less.

More specifically, it is preferable that the depth of the contact regulating groove is set to a predetermined value of 25 µm or more and 45 µm or less.

It is preferable that the magnetic recording medium sliding surface is tapered in an entrance side of the magnetic recording media, and the magnetic recording media is removed on an exit side.

In addition, it is preferable that the contact width regulating groove is formed in substantial proportion to a curvature of the magnetic recording medium in a sliding direction such that the contact width of the magnetic recording medium sliding surface and the depth of the contact width regulating groove are substantially constant as a whole.

In this case, when sliding noise of the magnetic head is to be reduced, a mechanism of generating the sliding noise is considered as follows. Vibration generated by sliding the magnetic recording medium and the magnetic head from each other is converted into magnetization by an inverted magnetostrictive phenomenon, and the magnetization is detected from the magnetic coil of the magnetic head.

The present inventors found, in the constituent members of the magnetic head, an area which is most easily vibrated by sliding between the magnetic recording medium and the magnetic head and has high probability that electromagnetic conversion characteristics are influenced, improved the area into a structure which is not easily vibrated so as to reduce vibration noise.

In addition, when the area is vibrated, a resonance phenomenon according to the dimensional ratio of the vibrators occurs, and sliding noise corresponding to the resonance frequency may be generated. For this reason, in contrast to this, the inventors found dimensions depending on the resonance, and changed the ratio of the dimensions, so that the resonance frequency was excluded from a use frequency band.

More specifically, in a magnetic head, an area which is most easily vibrated by sliding between the magnetic recording medium and the magnetic head and has high probability that electromagnetic conversion characteristics are influenced is an area surrounded by a contact width on the magnetic recording medium sliding surface and a contact width regulating groove for regulating the contact width. The height of this area, i.e., the depth of the contact width regulating groove is made smaller than the contact width, so that the rigidity of the area is improved, and resonance easily occurs. In addition, in the magnetic head, preferably, the contact width of the magnetic recording medium sliding surface is set to a value of 55±6 μm, the depth of the contact regulating groove is set to 37±12 μm, and a value R of the corner portion of the contact width regulating groove is set to 16 μm or less. In this case, resonance does not easily occur. Therefore, vibration caused by sliding of the magnetic recording medium is suppressed to reduce sliding noise. More preferably, the depth of the contact width regulating groove is set within the range of (35±10) μm, and occurrence of resonance becomes more difficult.

Even if resonance of the area occurs, the depth of the contact width regulating groove is set to be smaller than the contact width. For this reason, the resonance frequency shifts to a high frequency, and the resonance frequency is excluded from the use frequency band of the magnetic recording medium.

BRIEF DESCRIPTION OF THE DRAWINGS

FIG. 2 is a perspective view typically showing a magnetic head according to an embodiment of the present invention;

FIG. 3 is a side view typically showing the magnetic head;

FIG. 4 is a plan view typically showing the magnetic head;

FIG. 5 is a perspective view typically showing a magnetic head according to a modification of the embodiment;

FIG. 6 is a side view typically showing the magnetic head;

FIG. 7 is a plan view typically showing the magnetic head;

FIG. 15 is a perspective view typically showing a magnetic head according to the second embodiment of the present invention;

FIG. 16 is a side view typically showing the magnetic head;

FIG. 17 is a plan view typically showing the magnetic head;

DESCRIPTION OF THE PREFERRED EMBODIMENTS

Figure 1:
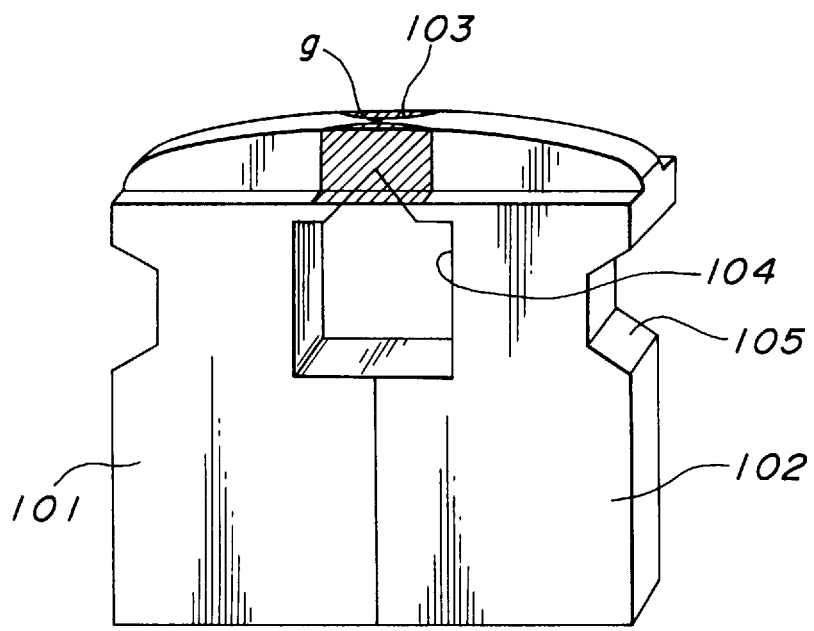
FIG. 1 is a perspective view typically showing a conventional magnetic head.
Figure 8:
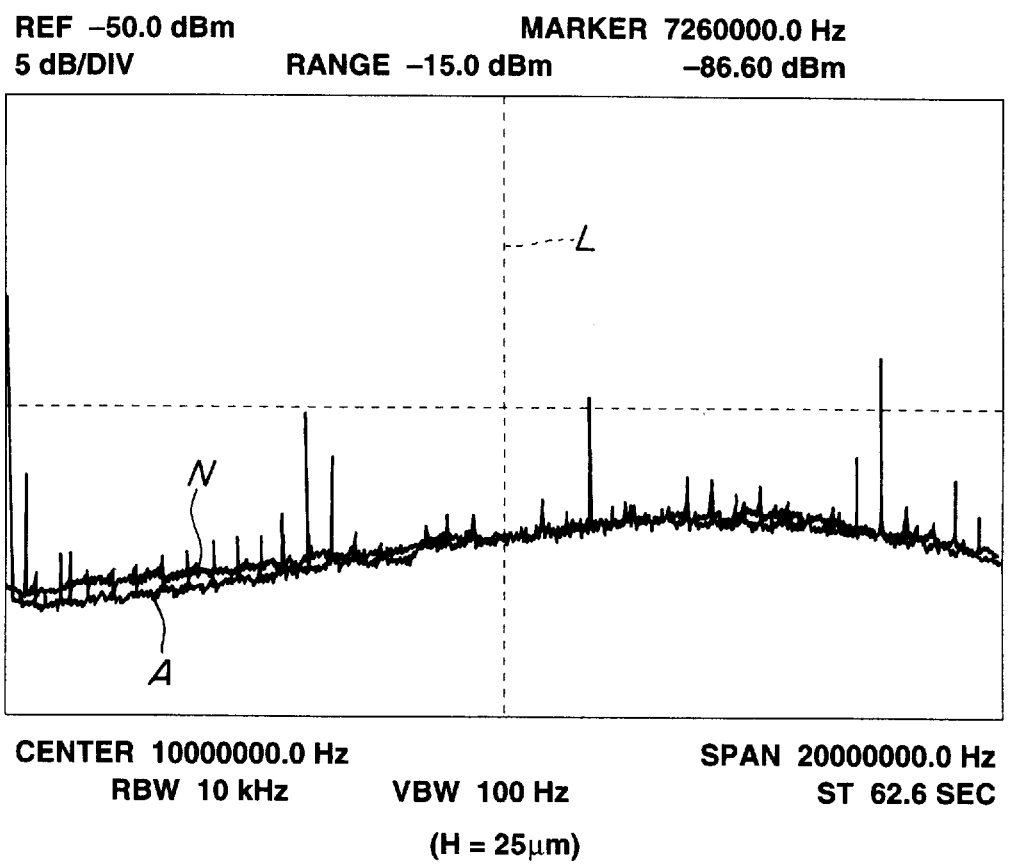
FIG. 8 is a graph showing a sliding noise spectrum of Sample 1.
Figure 9:
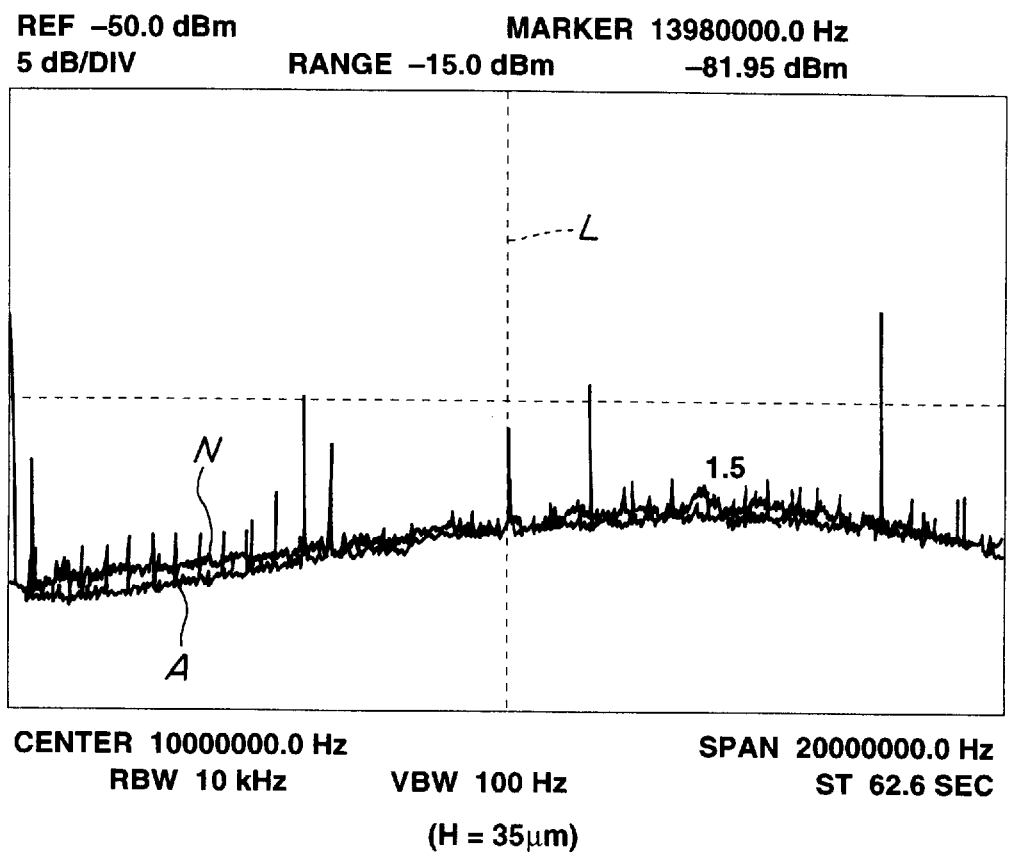
FIG. 9 is a graph showing a sliding noise spectrum of Sample 2.
Figure 10:
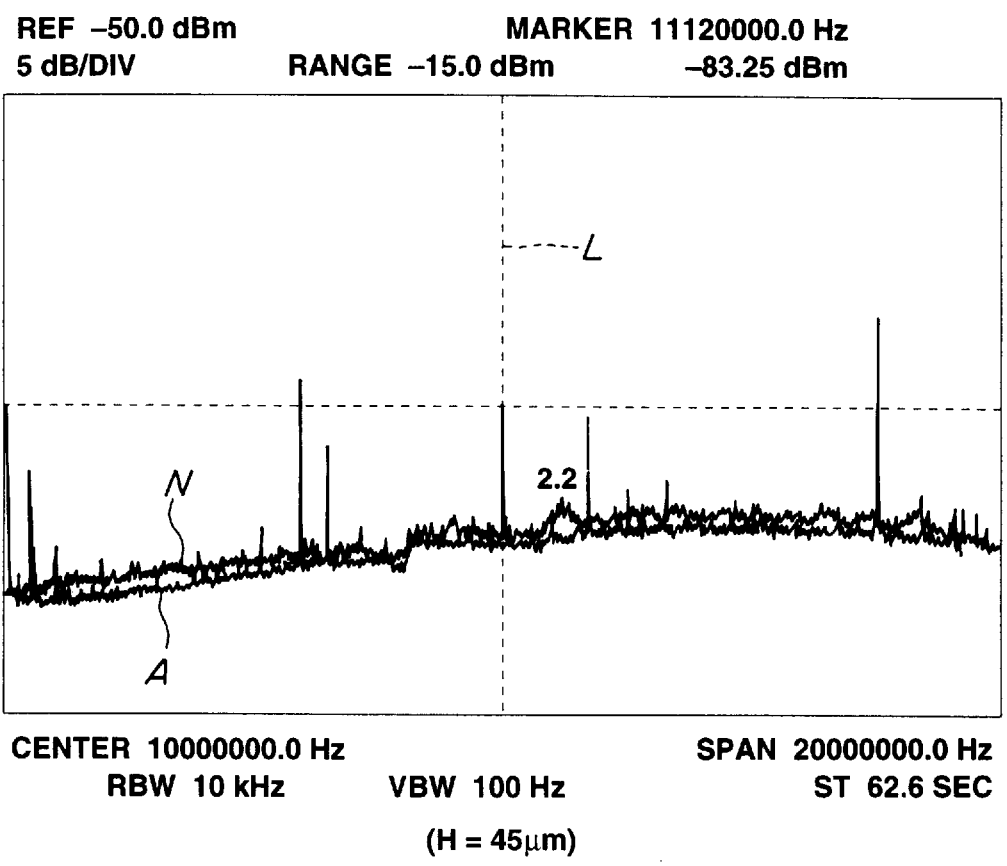
FIG. 10 is a graph showing a sliding noise spectrum of Sample 3.
Figure 11:
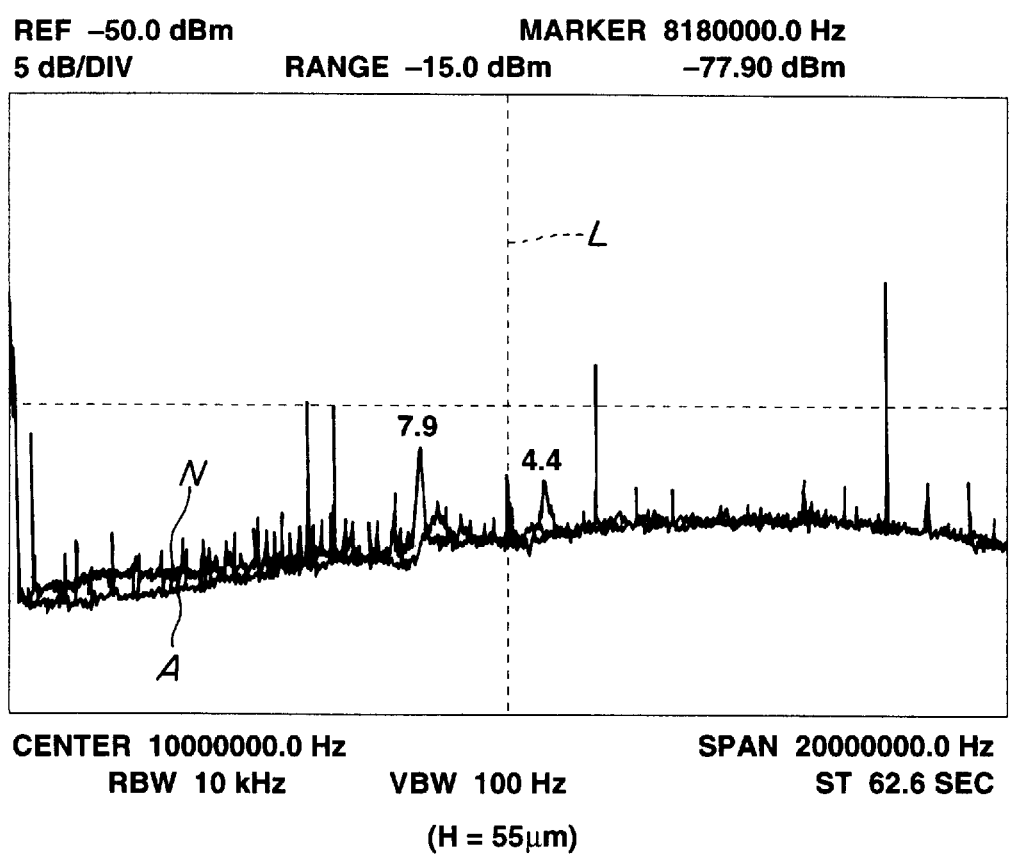
FIG. 11 is a graph showing a sliding noise spectrum of Sample 4.
Figure 12:
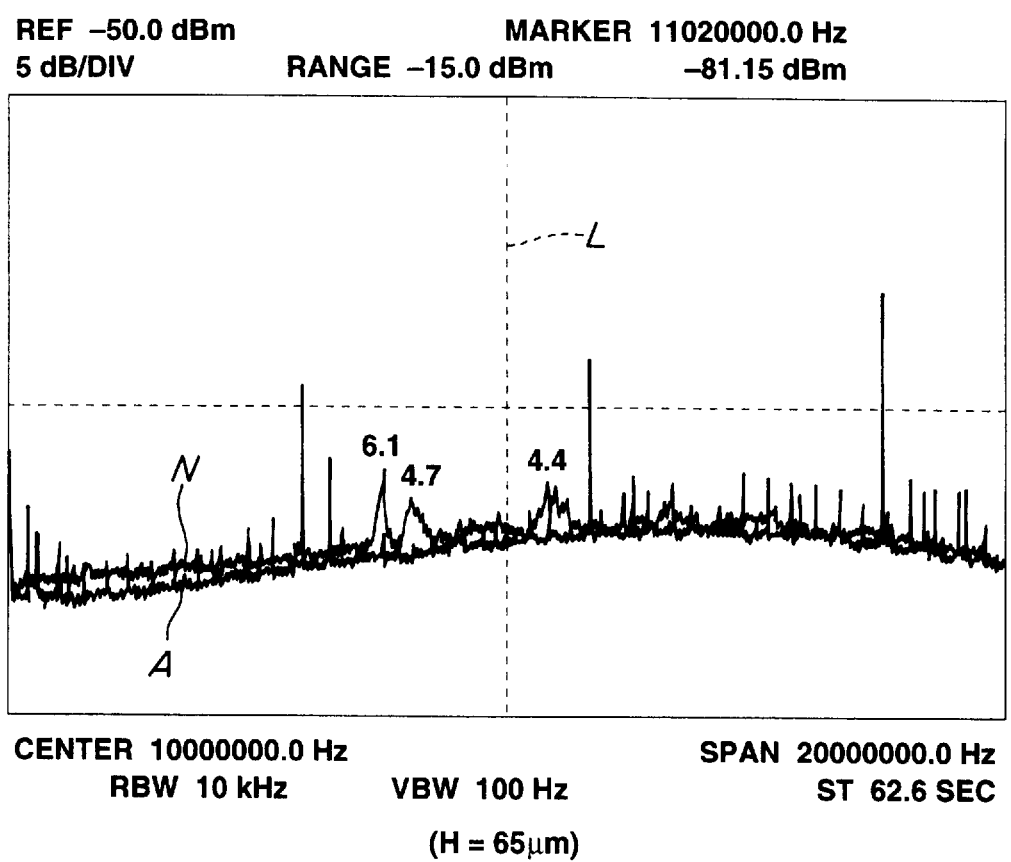
FIG. 12 is a graph showing a sliding noise spectrum of Sample 5.
Figure 13:
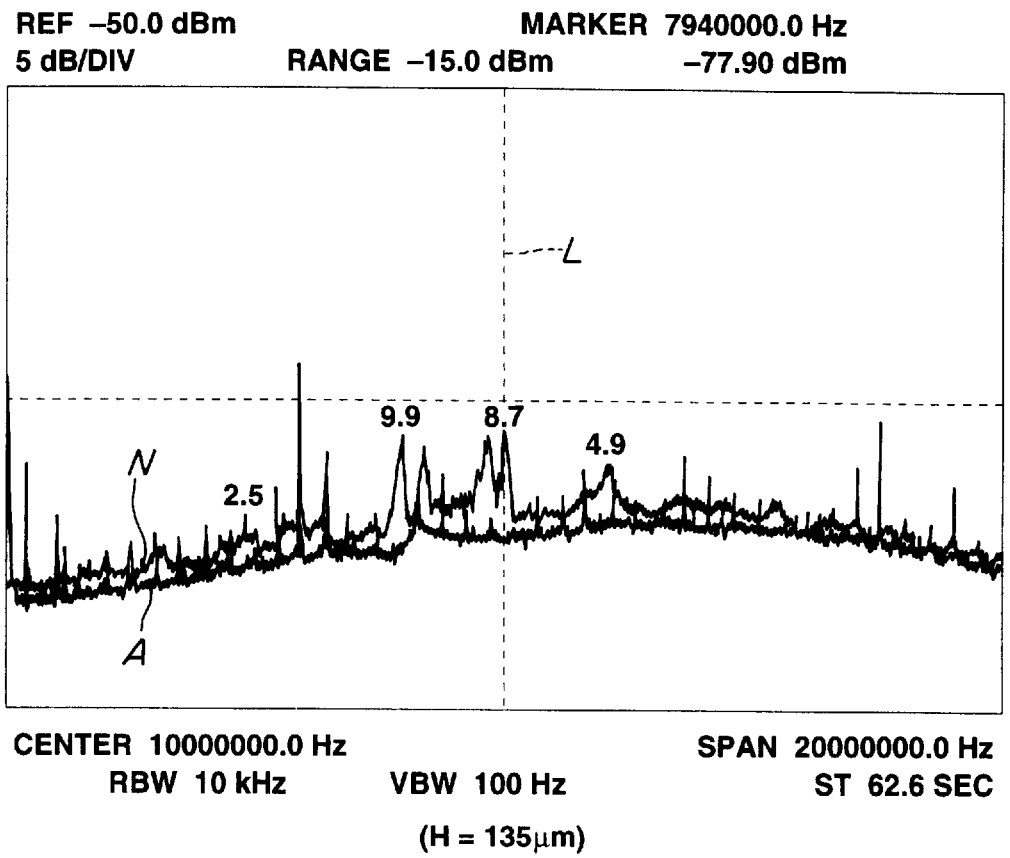
FIG. 13 is a graph showing a sliding noise spectrum of Sample 6.

Embodiments of a magnetic head according to the present invention will be described below with reference to the accompanying drawings.

A magnetic head according to the embodiment is of a so-called metal-in-gap (MIG) type, and has the following structure. That is, metal magnetic films consisting of a soft magnetic metal material are formed on the opposite surfaces of magnetic core half members.

As shown in FIGS. 2 and 4, this magnetic head is constituted such that a magnetic gap g is formed in a magnetic recording medium sliding surface a. The magnetic head is fixed on a predetermined substrate with an adhesive. The magnetic head is arranged on the peripheral surface of a rotating drum (not shown) to perform a recording/reproducing operation.

The magnetic head is constituted in the following manner. That is, a metal magnetic film 14 consisting of a soft magnetic metal material and a gap film 15 are sequentially formed on each major surface, in which a track width regulating groove 13 is formed, of a pair of magnetic core half members 11 and 12 consisting of monocrystalline ferrite. The major surfaces of the magnetic core half members 11 and 12 are opposite to each other, and a magnetic gap g having a predetermined azimuth angle is formed on the magnetic recording medium sliding surface a.

In this case, as the material of the magnetic core half members 11 and 12 near the magnetic gap, monocrystalline ferrite may be used, and polycrystalline ferrite may be used as the material of the remaining portion.

In this magnetic head, contact width regulating grooves 21 for regulating a contact width W between the magnetic recording medium sliding surface a and a magnetic tape are formed on both the side portions of the magnetic recording medium sliding surface a. Each of the contact width regulating grooves 21 has a depth H which is smaller than the contact width W on the magnetic recording medium sliding surface a, and which is set to a predetermined value of 25 μm or more and 45 μm or less here.

In the magnetic head, the magnetic recording medium sliding surface a is tapered on an entrance side m of a magnetic tape during traveling of the magnetic tape to form a tapered surface 22, and an exit side n of the magnetic tape is removed to form a notch portion 23.

When the magnetic core half members 11 and 12 are opposite to each other, a glass material for fusing is inserted into a glass groove (not shown) and melted at a high temperature to join the magnetic core half members 11 and 12 to each other.

A coil groove 16 for winding a coil and a guide groove 17 are formed in each of the magnetic core half members 11 and 12. When the magnetic core half members 11 and 12 are joined to each other, the coil grooves 16 are opposite to each other to form a coil window 18. Coils (not shown) are wound on the coil window 18 and the guide grooves 17 to constitute the magnetic head.

In this case, in order to reduce sliding noise of the magnetic head, a mechanism of generation of the sliding noise is considered as follows. Vibration generated by sliding between the magnetic tape and the magnetic head is converted into magnetization by an inverted magnetostrictive phenomenon, and the magnetization is detected from the magnetic coils of the magnetic head.

In this embodiment, an area which is most easily vibrated by sliding between the magnetic tape and the magnetic head, and has high probability that electromagnetic conversion characteristics are influenced is found in the constituent members of the magnetic head, and the area is improved to have a structure which is not easily vibrated so as to reduce vibration noise.

In addition, when the area is vibrated, a resonance phenomenon according to the dimensional ratio of the vibrators occurs, and sliding noise corresponding to the resonance frequency may be generated. For this reason, in contrast to this, dimensions depending on the resonance are found, and the ratio of the dimensions is changed, so that the resonance frequency is excluded from a use frequency band.

More specifically, in a magnetic head, an area which is most easily vibrated by sliding between the magnetic tape and the magnetic head, and has high probability that electromagnetic conversion characteristics are influenced is an area E surrounded by the contact width W on the magnetic recording medium sliding surface a and the contact width regulating groove 21 for regulating the contact width W. The height of this area E, i.e., the depth H of the contact width regulating groove 21 is made smaller than the contact width W, i.e., a value falling within the range of $(35\pm10)$ $\mu$m, so that the rigidity of the area is improved, and resonance does not easily occur. Therefore, vibration caused by sliding of the magnetic tape is suppressed to reduce sliding noise.

When resonance of the area E occurs, the depth H of the contact width regulating groove 21 is set to be smaller than the contact width W. For this reason, the resonance frequency shifts to a high frequency, and the resonance frequency is excluded from the use frequency band of the magnetic tape.

In the magnetic head, as the material of the magnetic core half members 11 and 12, especially, as a material constituting a portion near the magnetic gap g, a monocrystalline ferrite is used. For this reason, the sliding noise can be reduced as described above, and output characteristics, abrasion resistance, accurate processability, and the like can also be improved.

The entrance side m of the magnetic recording medium sliding surface a is processed into the tapered surface 22, and the exit side n is processed into the notch portion 23. For this reason, even if the shape of the magnetic recording medium sliding surface a is worn due to sliding between the magnetic recording medium sliding surface a and the magnetic tape, the contact width W can be prevented from being enlarged while assuring a predetermined contact length between the magnetic recording medium sliding surface a and the magnetic tape.

A method of manufacturing the magnetic head will be described below.

When the magnetic head is to be manufactured, a ferrite substrate consisting of Mn—Zn or the like is made planar by using a surface grinding machine.

In this case, although a monocrystalline substrate having a predetermined plain orientation is used, a monocrystalline substrate having another plain orientation or a joint substrate between monocrystalline ferrite and polycrystalline ferrite may be used.

Subsequently, a coil groove and a glass groove are formed on one major surface of the ferrite substrate by a slicer or the like, and a plurality of belt-like track width regulating grooves are formed by cutting or grinding in a direction which is substantially perpendicular to the coil groove and the glass groove.

Specular processing such as polishing is performed to a major surface of the ferrite substrate. Thereafter, the ferrite substrate is cut at its central portion to form a pair of magnetic core half blocks. In this case, one core half block has the coil groove and the glass groove, and the other magnetic core half block does not have these grooves.

The metal magnetic film 14 consisting of a soft magnetic metal material such as Fe—Ru—Ga—Si (SMX) is uniformly formed on each of entire major surfaces serving as opposite surfaces of the magnetic core half blocks by sputtering to have a film thickness of several $\mu$m.

In this case, although SMX is used as the material of the metal magnetic film 14, a crystalline magnetic film consisting of Sendust, Sendust+O, Sendust+N, SMX+O, SMX+N, or the like, an Fe-based fine crystal film, a Co-based crystal film, or the like may be used. In order to improve adhesion between the ferrite substrate 21 and the metal magnetic film 14, an underlying film is preferably formed on one major surface of the ferrite substrate by using an oxide such as $SiO_2$ or $Ta_2O_5$, a nitride such as $Si_3N_4$, a metal such as Cr, Al, Si, or Pt, an alloy thereof, or a material obtained by combining these materials. In this embodiment, an underlying film consisting of $SiO_2$ is formed to have a film thickness of 5 nm.

A single-layered gap film 17 consisting of $SiO_2$ is formed on the metal magnetic film 14 by sputtering. As the material of the gap film 17, a two-layered structure or a multi-layered structure obtained by forming a Cr film or the like as an upper layer may be used to prevent the gap film 17 from reacting with fuse glass.

Subsequently, while the magnetic core half blocks are opposite to each other, and are brought into press contact width each other such that the opposite surfaces are opposite to each other, the magnetic core half blocks are heated to 500° to 700° C. The magnetic core half blocks are joined to each other by using a glass material having a low melting point to manufacture a magnetic core block.

Cylindrical grinding is performed to one major surface of the magnetic core block in which the magnetic gap g is formed, and guide groove processing for a coil is performed.

Contact width processing for assuring the contact width W is performed to the magnetic recording medium sliding surface a to form the contact width regulating groove 21. At this time, the contact width regulating groove 21 is formed such that the contact width W is set to 56 $\mu$m, and the depth H is set to a predetermined value of 25 $\mu$m or more and 45 $\mu$m or less.

Cutting processing is performed to the magnetic core block at a predetermined azimuth angle to manufacture head chips each having the magnetic gap g.

Thereafter, on the magnetic recording medium sliding surface a of each of the head chip, the entrance side of the magnetic tape during traveling of the magnetic tap is tapered to form the tapered surface 22, and the exit side is removed to form the notch portion 23. These processing operations are performed in consideration of the maximum abrasion loss (depth D in this case) of the magnetic recording medium sliding surface a, and the contact width W is prevented from being enlarged by contact between the magnetic recording medium sliding surface a and the magnetic tape.

Cylindrical grinding is performed to the magnetic recording medium sliding surface a of each head chip in a longitudinal direction and a contact width direction which is substantially perpendicular to the longitudinal direction to form a curved surface having a predetermined curvature.

Post-processing such as winding processing is performed to each head chip, thereby completing the magnetic head.

A modification of the magnetic head according to this embodiment will be described below. The magnetic head of this modification has substantially the same arrangement as that of the magnetic head of the embodiment except for the shapes of the magnetic recording medium sliding surfaces. The same reference numerals as in the magnetic head of the embodiment denote the same parts in the same parts in the magnetic head of the modification, and a description thereof will be omitted.

In the magnetic head of the modification, a depth H of a contact width regulating groove 31 is set to be smaller than a contact width W on a magnetic recording medium sliding surface a. In this case, the depth H is set to a predetermined value of 25 µm or more and 45 µm or less. As shown in FIGS. 5 to 7, the contact width regulating groove 31 is formed in substantial proportion to the curvature of a magnetic tape in the sliding direction such that the contact width W and the depth H of the contact width regulating groove 31 are substantially constant as a whole.

As in the magnetic head according to the embodiment, the height H of the magnetic head of the modification is set within the range of (35±10) µm, the rigidity of the area E is improved, and resonance does not easily occur. Therefore, vibration caused by sliding of the magnetic tape is suppressed, so that generation of sliding noise is reduced.

When resonance of the area E occurs, the depth H of the contact width regulating groove 31 is set to be smaller than the contact width W. For this reason, the resonance frequency shifts to a high frequency, and the resonance frequency is excluded from the use frequency band of the magnetic tape.

In the magnetic head, as the material of magnetic core half members 11 and 12, especially, as a material constituting a portion near a magnetic gap g, a monocrystalline ferrite is used. For this reason, the sliding noise can be reduced as described above, and output characteristics, abrasion resistance, accurate processability, and the like can also be improved.

Since the contact width regulating groove 31 is formed in substantial proportional to the curvature of the magnetic tape in the sliding direction, even if the shape of the magnetic recording medium sliding surface a is worn due to sliding between the magnetic recording medium sliding surface a and the magnetic tape, the contact width W can be prevented from being enlarged while assuring a predetermined contact length between the magnetic recording medium sliding surface a and the magnetic tape.

Here, several experiments using the magnetic head according to the embodiment (including the modification) will be described below.
(Experiment 1)

As Experiment 1, the magnetic head according to the embodiment was examined with respect to a sliding noise spectrum when a magnetic tape in a non-recording state is caused to travel by using Samples 1 to 4 in which the depths H of the contact width regulating grooves 21 were set within the range of 35±10 µm and Samples 5 and 6 for comparison in which the depths H were excluded from the range.

In this case, the depths in Samples 1 to 4 were set to 25 µm, 35 µm, 45 µm, and 55 µm, respectively, and the depths in Samples 5 and 6 were set to 65 µm and 135 µm, respectively.

The azimuth angle of each sample was set to 10°, and the relative speed of the sample to a magnetic tape in a sliding operation was set to 3.8 m/s. An amount of projection of a corner sample on the rotating drum was set to 18.5±0.5 µm, and the curvature radius of the magnetic recording medium sliding surface was set to 6.5 mm.

The results obtained in Experiment 1 with respect to Samples 1 to 6 are shown in FIGS. 8 to 13, respectively. In these graphs, amplifier noise A is superposed on sliding noise N.

In this manner, with respect to Samples 5 and 6, a noise level is high, and a sharp noise spectrum in a use frequency band (10 MHz or less, a position at 10 MHz is indicated by a broken line L in FIGS. 8 to 13) are conspicuous. In contrast to this, with respect to Samples 1 to 4, a noise level is low, and noise in the use frequency band is reduced to an almost negligible level.
(Experiment 2)

Experiment 2 will be described below. In this case, an abrasion change on a magnetic recording medium sliding surface was examined by using the magnetic heads of the embodiment and the modification on the basis of comparison between the magnetic heads and a magnetic head of Comparative Example.

In Experiment 2, the magnetic head of the embodiment was defined as Sample 11, the magnetic head of the modification was defined as Sample 12, and a magnetic head which had the same arrangement as that of Sample 11 but had a small depth H at the entrance end and exit end of the magnetic recording medium sliding surface was defined as Sample 13. A predetermined wrapping tape was used in place of a magnetic tape, and the wrapping tape was slid on each magnetic recording medium sliding surface every 3 minutes.

Figure 14:
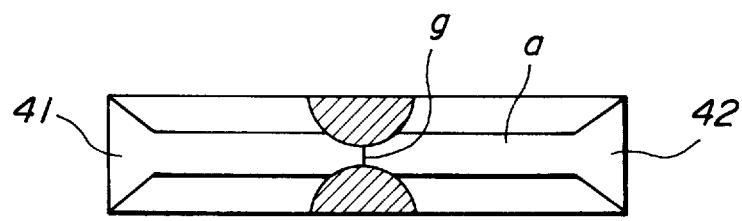
FIG. 14 is a plan view showing a manner that a contact width increases by abrasion at the entrance and exit ends of the magnetic head upon completion of sliding.

As the results obtained in Experiment 2, with respect to Samples 11 and 12, the contact width W of the magnetic recording medium sliding surface a did not change even upon completion of sliding. However, with respect to Sample 13, as shown in FIG. 14, the contact width W increased at an entrance end 41 and an exit end 42 by abrasion upon completion of sliding.

As is apparent from the above experiment, according to the magnetic heads of the embodiment and the modification, low noise can be realized while keeping abrasion characteristics excellent.

On the other hand, a magnetic head is not limited to the magnetic head described in the above embodiment, and a magnetic head described in the following second embodiment may be used. The same reference numerals as in the magnetic head according to the above embodiment denote the same parts in the magnetic head according to the second embodiment, and a description of the arrangement and operation of the magnetic head according to the present invention will be omitted.

The magnetic head according to the second embodiment, as shown in FIGS. 15 to 17, has the same arrangement as that of the magnetic head according to the embodiment except for the shapes of contact width regulating grooves. In the magnetic head according to the second embodiment, a contact width W of a magnetic recording medium sliding surface a is set to a predetermined value of 55±6 μm, and a contact width regulating groove 51 is formed such that a depth H of the contact width regulating groove 51 is set to a predetermined value of 37±12 μm. In the magnetic head, the contact width regulating groove 51 is formed such that a value R of a corner portion 51a is set to a predetermined value of 16 μm or less. The magnetic head is constituted such that a depth is set to 15 μm or more.

In the magnetic head, the magnetic recording medium sliding surface a is a (110) crystal plane, the major magnetic path forming surfaces 11a and 12a are (110) crystal planes, and opposite surfaces are (100) crystal planes.

In a magnetic head according to the second embodiment arranged as described above, an area which is most easily vibrated by sliding between the magnetic tape and the magnetic head and has high probability that electromagnetic conversion characteristics are influenced is an area E surrounded by the contact width W on the magnetic recording medium sliding surface a and the contact width regulating groove 51 for regulating the contact width W. The height of this area E, i.e., the depth H of the contact width regulating groove 51 is set to a predetermined value of 37±12 μm, the contact width W is set to a predetermined value of 55±6 μm, and the value R of the corner portion 51a of the contact width regulating groove 51 is set to a predetermined value of 16 μm or less. In this manner rigidity of the area E is improved, and resonance does not easily occur. Therefore, vibration caused by sliding of the magnetic tape is suppressed to reduce sliding noise. When resonance of the area E occurs, the depth H of the contact width regulating groove 51 is set to be smaller than the contact width W. For this reason, the resonance frequency shifts to a high frequency, and the resonance frequency is excluded from the use frequency band of the magnetic tape.

In this magnetic head, since the value R of the corner portion 51a of the contact width regulating groove 51 is set to the predetermined value of 16 μm or less, the width of the magnetic gap is kept substantially uniform over the magnetic gap. More specifically, in this magnetic head, the width of the magnetic gap is kept substantially uniform at the upper and lower ends without increasing at the lower end side. In the magnetic head, the contact width regulating groove 51 is formed by using a high-precision grindstone to set the value R at 16 μm or less.

In this manner, in the magnetic head, the width of the magnetic gap is substantially uniform. For this reason, the magnetic head always has the contact width W which is substantially constant. In contrast to this, when the value R is larger than 16 μm, the contact width W increases with abrasion of the magnetic recording medium sliding surface a, and the contact state of the magnetic tape becomes poor. In addition, in the magnetic head, when the value R is increased, complex vibration occurs when vibration is generated. Therefore, in the magnetic head, even if the contact width W of the magnetic recording medium sliding surface and the depth H of the contact width regulating groove 51 are regulated, high vibration noise may be generated.

This magnetic head is manufactured through the same manufacturing steps as those of the magnetic head of the first embodiment. In these magnetic heads, in order to increase a yield, the depth D of the magnetic gap must be accurately measured. The depth D of the magnetic gap is measured in the following manner. That is, predetermined light is irradiated on the magnetic gap from the side surface direction of the magnetic gap to be transmitted through the magnetic gap, and the light transmitted through the magnetic gap is detected.

In the magnetic head according to the second embodiment, since the value R is set to 16 μm or less, light is preferably transmitted near the lower end portion of the magnetic gap, i.e., a portion having a depth of 0. For this reason, the depth D is accurately measured. In contrast to this, when the value R is 16 μm or more, a surface state near the portion having a depth of 0 becomes poor. For this reason, in the magnetic head having a value R set to 16 μm or more, light is not easily transmitted near the portion having a depth of 0, and the depth D cannot be accurately measured.

In the magnetic head, as the material of the magnetic core half members 11 and 12, monocrystalline ferrite serving as the material constituting a portion near the magnetic gap g is used. For this reason, sliding noise can be reduced as described above, and output characteristics, abrasion resistance, accurate processability, and the like can also be improved.

In addition, the entrance side m of the magnetic recording medium sliding surface a is processed into a tapered surface 22, and the exit side n is processed into a notch portion 23. For this reason, even if the shape of the magnetic recording medium sliding surface a is worn due to sliding between the magnetic recording medium sliding surface a and the magnetic tape, the contact width W can be prevented from being enlarged while assuring a predetermined contact length between the magnetic recording medium sliding surface a and the magnetic tape.

Here, several experiments using the magnetic head according to the second embodiment will be described below.

(Experiment 3)

As Experiment 3, with respect to magnetic heads which are manufactured such that the depth H of the contact width regulating groove 51 were set to various values, sliding noise and resonance frequency were measured.

At this time, in all the manufactured magnetic heads, the same material was used, the same plain orientation was set, and the same contact width W was set. In each of these magnetic heads, the value R of the corner portion 51a of the contact width regulating groove 51 was set to about 11 μm. Each magnetic head was constituted such that an azimuth angle of 10°.

In Experiment 3, an unused coating type magnetic tape was used for the magnetic head manufactured as described above. A relative speed between the magnetic head and the magnetic head was set to 3.8 m/s. At this time, the magnetic head was used to be incorporated in a rotating drum. The magnetic head projects to the rotating drum by a length falling within the range of 21±0.5 μm, the contact width between the magnetic head and the magnetic tape was set to about 56 μm, and the value R of the leading end was set to 6 mm.

Figure 18:
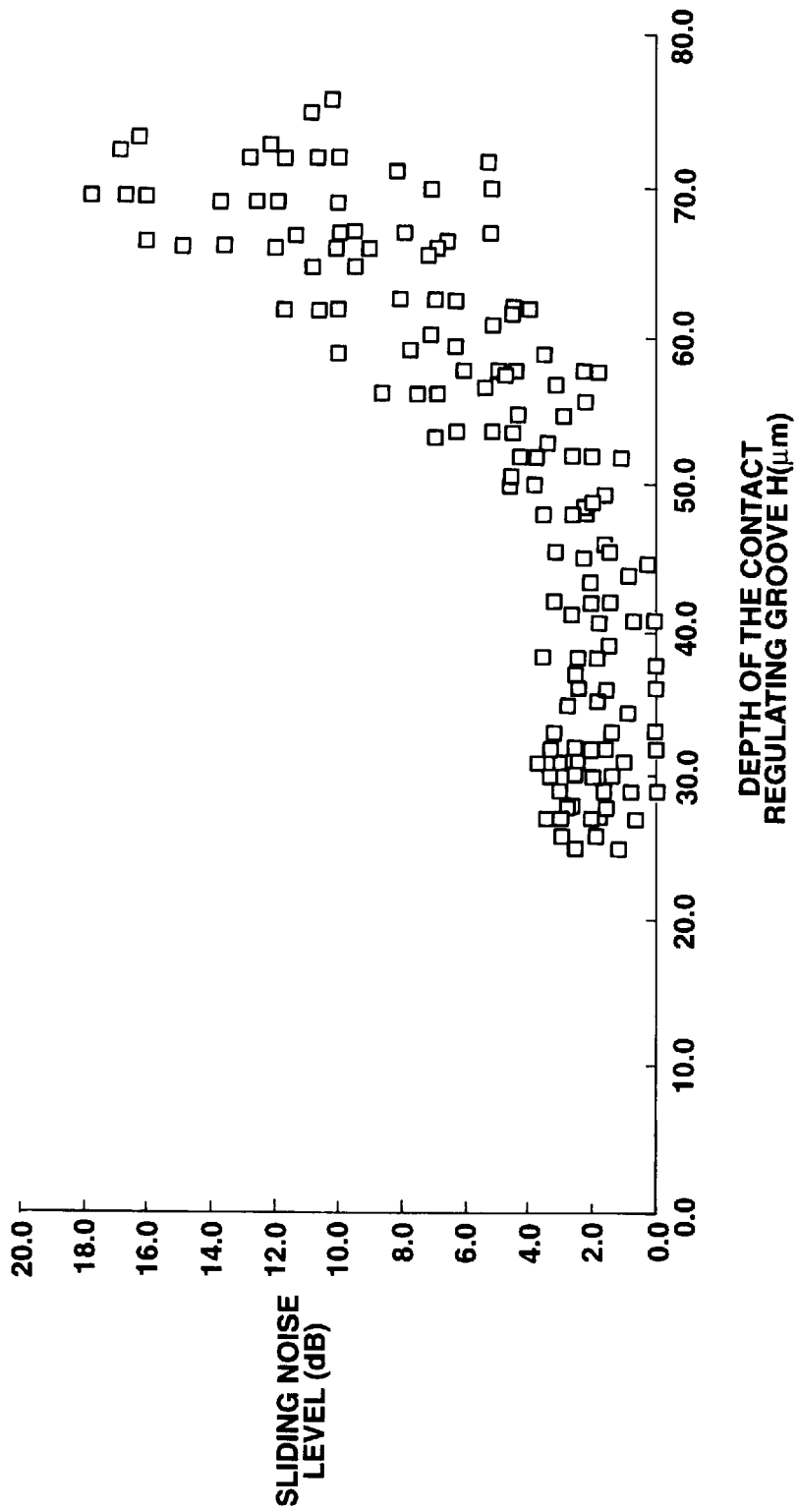
FIG. 18 is a graph showing the relationship between the depth of a contact width regulating groove and sliding noise.

The result obtained by measuring sliding noise generated when the depth H of the contact width regulating groove 51 is changed is shown in FIG. 18. As is apparent from FIG. 18, when the depth H is set to a predetermined value falling within the range of 37±12 μm, the value of the sliding noise is kept low. Specifically, when the sliding noise does not exceed about 4.0 dB, preferable electromagnetic conversion characteristics can be obtained.

Figure 19:
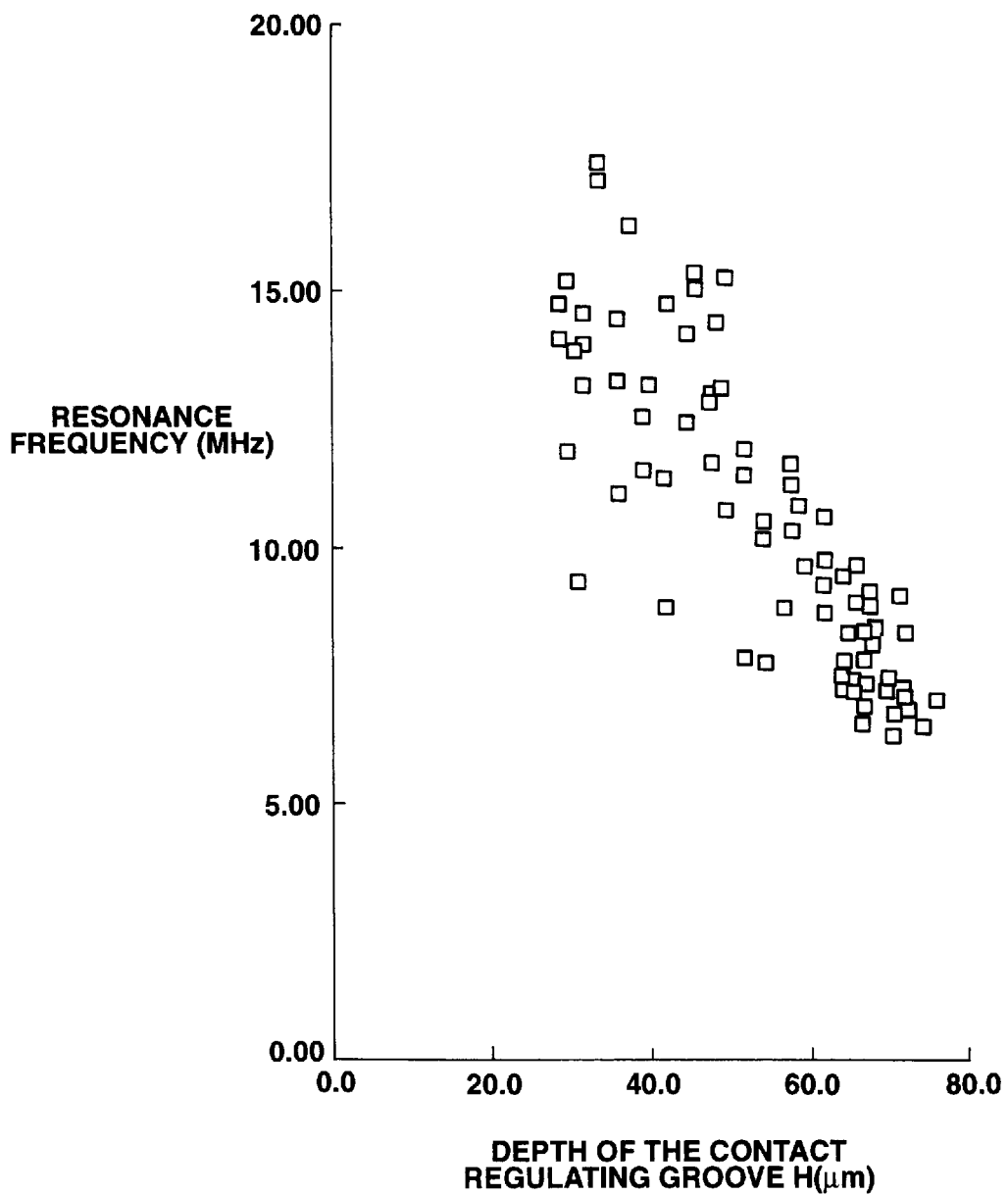
FIG. 19 is a graph showing the relationship between the depth of the contact width regulating groove and a resonance frequency.

The result obtained by measuring sliding noise generated when the depth H of the contact width regulating groove 51 is changed is shown in FIG. 19. As is apparent from FIG. 19, when the depth H is set to a predetermined value falling within the range of 37±12 μm, a resonance frequency becomes a high frequency. More specifically, the depth H is set within the range of 37±12 μm, the resonance frequency is set to a frequency higher than the use frequency band, i.e., about 10 MHz or more. Therefore, when the depth H is set to a predetermined value falling within the above range, the magnetic head is not adversely affected by the resonance frequency, and has preferable electromagnetic conversion characteristics.

(Experiment 4)

As Experiment 4, sliding noise of the magnetic heads manufactured such that the values R of the corner portions 51a of the contact width regulating grooves 51 were set to various values was measured.

At this time, the manufactured magnetic head was manufactured in the following manner. That is, the depth H of the contact width regulating groove 51 was set to 37±12 μm, the contact width W of the magnetic recording medium sliding surface was set to 55±6 μm, and the value R of the corner portion 51a of the contact width regulating groove 51 was controlled by adjusting a grindstone used for forming the contact width regulating groove 51.

Figure 20:
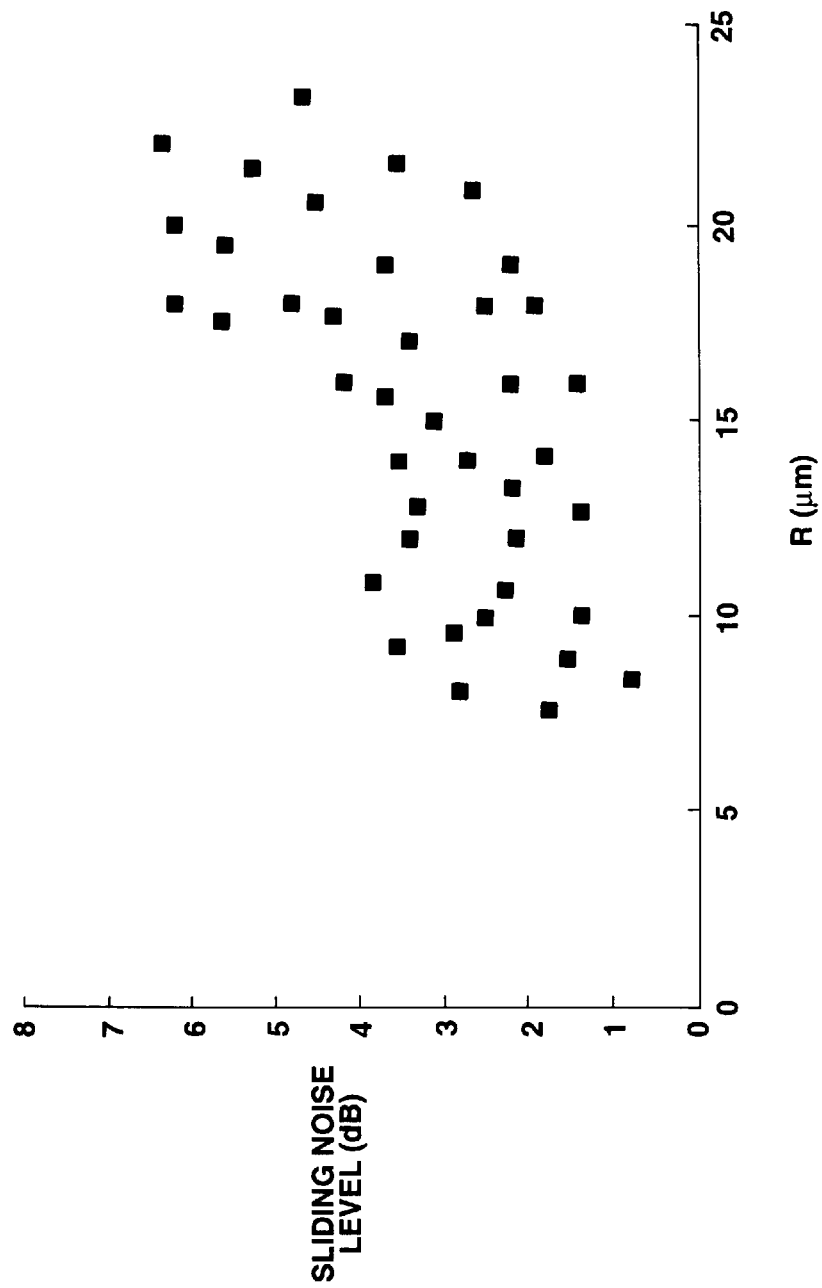
FIG. 20 is a graph showing the relationship between a value R of the corner portion of the contact width regulating groove and sliding noise.

In Experiment 4, sliding noise of the magnetic head manufactured as described above was measured under the same conditions as in Experiment 3 described above. The measurement result is shown in FIG. 20. As is apparent from FIG. 20, with an increase of the value R, a variation in generated sliding noise increases. In addition, when the value R is large, relatively high sliding noise is also generated.

In contrast to this, when the value R is 16 μm or less, generated sliding noise does not exceed about 4.0 dB, a variation in sliding noise is small, and relatively high sliding noise is not generated. Therefore, in the magnetic head, when the value R is set to 16 μm or less, preferable electromagnetic conversion characteristics can be obtained.

(Experiment 5)

As Experiment 5, it was examined whether depths D of magnetic heads manufactured such that the values R of the corner portions 51a of the contact width regulating grooves 51 were variably changed could be measured by causing light to be transmitted through the magnetic gaps of the magnetic heads from the side directions of the magnetic gaps.

At this time, in each of the manufactured magnetic heads, the depth H of the contact width regulating groove 51 was set to 37±12 μm, the contact width W of the magnetic recording medium sliding surface was set to 55±6 μm, and the value R of the corner portion 51a of the contact width regulating groove 51 was controlled by adjusting a grindstone used for forming the contact width regulating groove 51.

In Experiment 5, light was irradiated on a portion near the magnetic gap of the magnetic head manufactured as described above, and transmission of the light was detected, thereby measuring a depth D. At this time, a ratio of magnetic heads whose depths D could be measured was calculated, the calculation value was used as a depth D recognition yield. The relationship between the value R and the depth D recognition yield is shown in FIG. 20.

Figure 21:
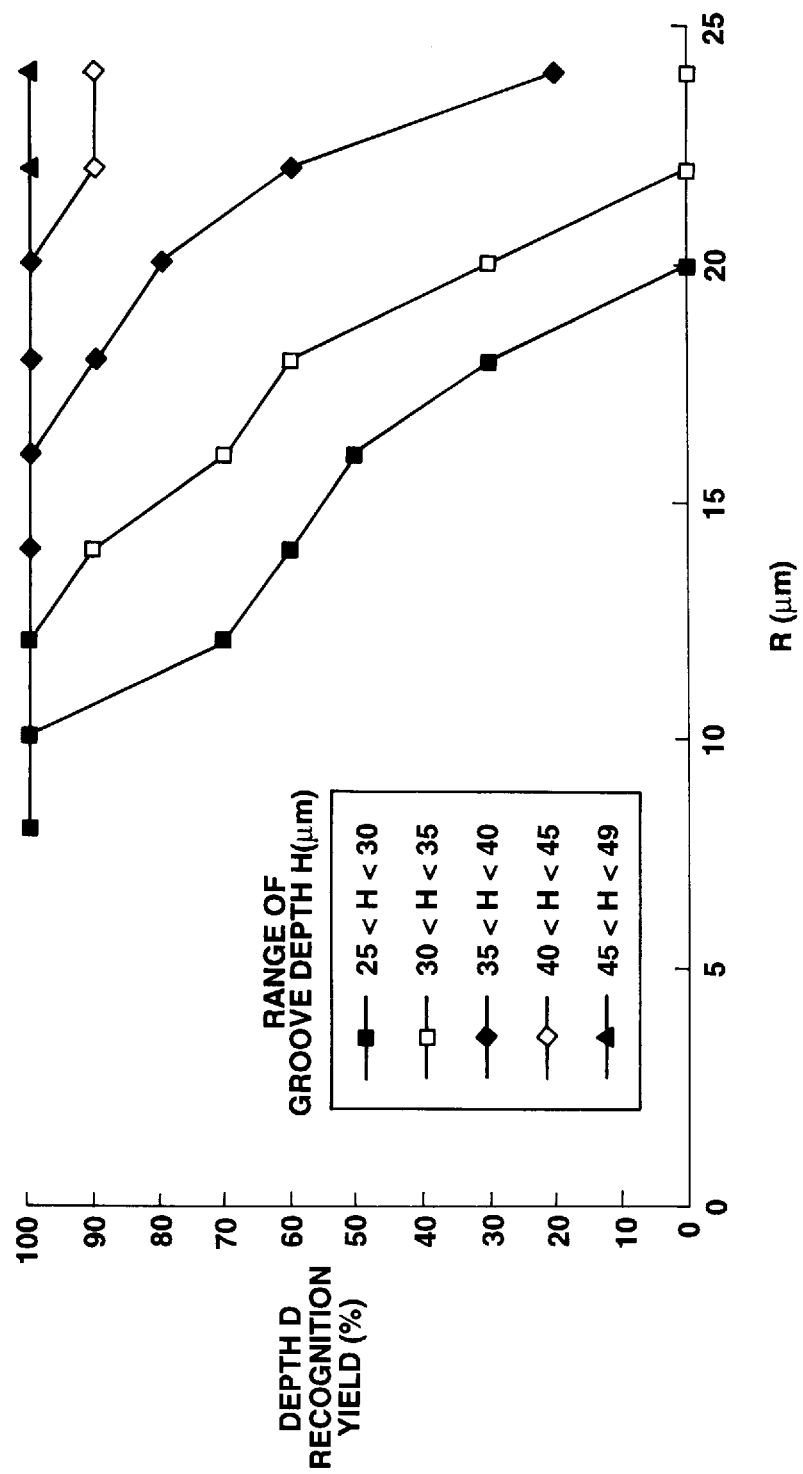
FIG. 21 is a graph showing the relationship between the value of R of the corner portion of the contact width regulating groove and a yield of recognition of a depth D.

In Experiment 5, the depths H of the contact width regulating grooves 51 were grouped in a predetermined range, and a depth D recognition yield in each group was measured. As is apparent from FIG. 21, when the value R is 16 μm or less in any group, the depth D recognition yield exceeds 50%. For this reason, in the magnetic head, when the value R is set to 16 μm or less, the depth D can be correctly measured without measurement fault.

Although the embodiments to which the present invention is applied and the modification of the embodiments have been described above, the present invention is not limited to these embodiments and modification. The present invention can be arbitrarily changed in shape, material, dimension, and the like without departing from the spirit and scope of the invention.

According to a magnetic head of the present invention, sliding noise characteristics can be considerably improved without degrading electromagnetic conversion characteristics or abrasion characteristics in a recording/reproducing operation.

What is claimed is:

1. A magnetic head formed by the joinder of two magnetic core half members with a gap forming film between the two magnetic core half members, said head having a recording sliding surface and a pair of contact width defining rabbets formed on opposite sides of said head in said recording medium sliding surface, said rabbets having widths delimiting the width of contact between recording medium and said recording medium sliding surface of said head, said rabbets having depths as measured from said recording medium sliding surface which are less than the width of contact between the recording medium and said recording medium sliding surface of said head.

2. A magnetic head according to claim 1, characterized in that the contact width of the magnetic recording medium sliding surface is set to a value of 55±6 μm, the depths of the contact regulating rabbets are set to 37±12 μm, and a value R of a corner portion of the contact regulating rabbets are set to not more than 16 μm.

3. A magnetic head according to claim 2, characterized in that the depths of the contact width regulating rabbets are set to not less than 25 μm and not more than 45 μm.

4. A magnetic head according to claim 1, characterized in that the contact width of the magnetic recording medium sliding surface and the depth of the contact width recording rabbets are substantially as a whole.

5. A magnetic head according to claim 1, characterized in that the magnetic recording medium sliding surface is tapered on an entrance side of the magnetic recording medium during traveling of the magnetic recording medium, and the magnetic recording medium is removed on an exit side of the magnetic recording medium sliding surface.

6. A magnetic head according to claim 1, characterized in that each magnetic core half member consists of monocrystalline ferrite.

7. A magnetic head according to claim 1, characterized in that each magnetic core half member has a portion consisting of monocrystalline ferrite near the magnetic gap, and the remaining portion consists of polycrystalline ferrite.

8. A magnetic head according to claim 1, characterized in that a metal magnetic film having a high saturation magnetic flux density is formed on each of the opposite surfaces of the pair of magnetic core half members.

9. A magnetic head formed by the joinder of two magnetic core half members with a gap forming film between the two magnetic core half members, said head having a recording sliding surface and a pair of contact width defining rabbets formed on opposite sides of said head in said recording medium sliding surface, said rabbets having widths delimiting the width of contact between recording medium and said recording medium sliding surface of said head, said rabbets having depths as measured from said recording medium sliding surface which are less than the width of contact between the recording medium and said recording medium sliding surface of said head, wherein, the contact width of the magnetic recording medium sliding surface is set to a value of 55±6 μm, the depths of the contact regulating rabbets are set to 37±12 μm, and a value R of a corner portion of the contact regulating rabbets are set to not more than 16 μm;

the contact width of the magnetic recording medium sliding surface and the depth of the contact width recording rabbets are substantially as a whole; and the magnetic recording medium sliding surface is tapered on an entrance side of the magnetic recording medium during traveling of the magnetic recording medium, and the magnetic recording medium is removed on an exit side of the magnetic recording medium sliding surface.

10. A magnetic head formed by the joinder of two magnetic core half members with a gap forming film between the two magnetic core half members, said head having a recording sliding surface and a pair of contact width defining rabbets formed on opposite sides of said head in said recording medium sliding surface, said rabbets having widths delimiting the width of contact between recording medium and said recording medium sliding surface of said head, said rabbets having depths as measured from said recording medium sliding surface which are less than the width of contact between the recording medium and said recording medium sliding surface of said head, wherein, the contact width of the magnetic recording medium sliding surface is set to a value of 55±6 μm, the depths of the contact regulating rabbets are set to not less than 25 μm and not more than 45 μm, and a value R of a corner portion of the contact regulating rabbets are set to not more than 16 μm;

the contact width of the magnetic recording medium sliding surface and the depth of the contact width recording rabbets are substantially as a whole; and the magnetic recording medium sliding surface is tapered on an entrance side of the magnetic recording medium during traveling of the magnetic recording medium, and the magnetic recording medium is removed on an exit side of the magnetic recording medium sliding surface.

11. A magnetic head formed by the joinder of two magnetic core half members with a gap forming film between the two magnetic core half members, said head having a recording sliding surface and a pair of contact width defining rabbets formed on opposite sides of said head in said recording medium sliding surface, said rabbets having widths delimiting the width of contact between recording medium and said recording medium sliding surface of said head, said rabbets having depths as measured from said recording medium sliding surface which are less than the width of contact between the recording medium and said recording medium sliding surface of said head, wherein, the contact width of the magnetic recording medium sliding surface is set to a value of 55±6 μm, the depths of the contact regulating rabbets are set to 37±12 μm, and a value R of a corner portion of the contact regulating rabbets are set to not more than 16 μm;

the contact width of the magnetic recording medium sliding surface and the depth of the contact width recording rabbets are substantially as a whole;

the magnetic recording medium sliding surface is tapered on an entrance side of the magnetic recording medium during traveling of the magnetic recording medium, and the magnetic recording medium is removed on an exit side of the magnetic recording medium sliding surface;

each magnetic core half member consists of monocrystalline ferrite;

each magnetic core half member has a portion consisting of monocrystalline ferrite near the magnetic gap, and the remaining portion consists of polycrystalline ferrite; and a metal magnetic film having a high saturation magnetic flux density is formed on each of the opposite surfaces of the pair of magnetic core half members.

* * * * *